United States Patent
Pawa et al.

(10) Patent No.: US 8,424,858 B2
(45) Date of Patent: Apr. 23, 2013

(54) FLEXIBLE FIXTURE SYSTEM FOR MACHINING OPERATIONS

(75) Inventors: Kharati Pawa, Clinton Township, MI (US); Brian Holmes, Peterburg, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 333 days.

(21) Appl. No.: 12/853,874

(22) Filed: Aug. 10, 2010

(65) Prior Publication Data

US 2011/0049778 A1 Mar. 3, 2011

Related U.S. Application Data

(60) Provisional application No. 61/239,095, filed on Sep. 2, 2009.

(51) Int. Cl.
*B23Q 3/08* (2006.01)
(52) U.S. Cl.
USPC .................................. 269/27; 269/17; 269/24
(58) Field of Classification Search ................ 269/32, 269/24, 27, 17; 254/8 B, 9 B, 2 B
See application file for complete search history.

(56) References Cited

U.S. PATENT DOCUMENTS

| | | | | |
|---|---|---|---|---|
| 3,294,392 A * | 12/1966 | Dunham | | 269/21 |
| 4,723,766 A * | 2/1988 | Beeding | | 269/21 |
| 5,713,563 A * | 2/1998 | Chan | | 269/27 |
| 5,775,395 A * | 7/1998 | Wilkins | | 144/286.5 |
| 6,113,087 A | 9/2000 | Taylor | | |
| 6,189,876 B1 * | 2/2001 | Frazier | | 269/21 |
| 6,513,802 B2 * | 2/2003 | Seger | | 269/21 |
| 6,764,258 B1 * | 7/2004 | Akre | | 409/219 |
| 6,817,601 B2 * | 11/2004 | Schmalz et al. | | 269/21 |
| 7,665,717 B2 * | 2/2010 | Lenzini | | 269/21 |
| 2004/0188906 A1 * | 9/2004 | Gunnarsson | | 269/20 |
| 2009/0179365 A1 * | 7/2009 | Lerner et al. | | 269/21 |

* cited by examiner

*Primary Examiner* — Robert Canfield
*Assistant Examiner* — Brent W Herring

(57) ABSTRACT

A flexible fixture system for a CNC machine is coupled to a base fixture. The flexible fixture includes quick connects that connect with the base fixture in order to allow hydraulic fluid, air, and water to be communicated from the base fixture to the flexible fixture system. The flexible fixture system includes features operable to hold a workpiece within the CNC machine. The flexible fixture system is modular and may be swapped out for a different flexible fixture in order to allow other operations to be performed on the workpiece.

17 Claims, 5 Drawing Sheets

One skilled in the art will recognize the numbers refer to the same component, element or feature.

FLEXIBLE FIXTURE SYSTEM FOR MACHINING OPERATIONS

CROSS-REFERENCE TO RELATED APPLICATIONS

This application claims priority to U.S. Provisional Application No. 61/239,095, filed on Sep. 2, 2009, which is hereby incorporated in its entirety herein by reference.

FIELD

The invention relates generally to a flexible fixture system for machining a workpiece, and more particularly to a flexible fixture system that is adaptable with a base fixture in a machining operation.

BACKGROUND

The statements in this section merely provide background information related to the present disclosure and may or may not constitute prior art.

Computer numerical controlled (CNC) machines are employed in manufacturing to create complex shapes out of metal or other solid materials. For example, CNC machines are used in machining transmission cases and valve bodies in automotive applications. CNC machines come in many sizes and types, such as vertical and horizontal, and can perform multiple operations such as milling, drilling, tapping, and reaming. Generally, a CNC machine includes a base fixture that holds a workpart or workpiece. A tool, which may include, for example, drills, taps, reamers, boring tools, grooving tool, milling cutters, etc., is positioned relative to the workpiece. A controller then controls the position of the fixture and/or the tool in order to perform a machining operation on the workpiece. Depending on the type of CNC machine used, anywhere from two to five axes of movement of the tool relative to the base fixture may be employed.

Depending on the complexity of the machining operation to be performed, the base fixture may be heavy and complicated. For example, in CNC machines with vertical and horizontal base fixtures, these base fixtures typically include complex hydraulic and pneumatic controls to interact with the tool as well as clamps to hold the workpiece in place. Typically, CNC machines are dedicated to a particular component or operation using dedicated base fixtures. However, the changing of the base fixture on CNC machines can take much time and extensive setup. In applications that have low volume requirement of parts and machining in small lots, the time and setup required to replace the base fixture is especially inefficient. Accordingly, there is room in the art for a system for adapting the ability of a CNC machine to accommodate multiple parts and operations without requiring replacement of the base fixture

SUMMARY

The present invention provides a flexible fixture system for a CNC machine. The CNC machine includes a base fixture having quick change clamps and hydraulic and pneumatic quick change connectors. The flexible fixture system is coupled to the base fixture. The flexible fixture includes quick connects that connect with the base fixture in order to allow hydraulic fluid, air, and water to be communicated from the base fixture to the flexible fixture system. The flexible fixture system includes features operable to hold the workpiece within the CNC machine. The flexible fixture system is modular and may be swapped out for a different flexible fixture in order to allow other operations to be performed on the workpiece.

In one example of the present invention, the flexible fixture is connected to the base fixture via four hydraulic clamps.

In another example of the present invention, the flexible fixture includes hydraulic passages that connect with the quick connect fixtures.

In another example of the present invention, an assist device is used to remove and replace the flexible fixture system on the base fixture.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
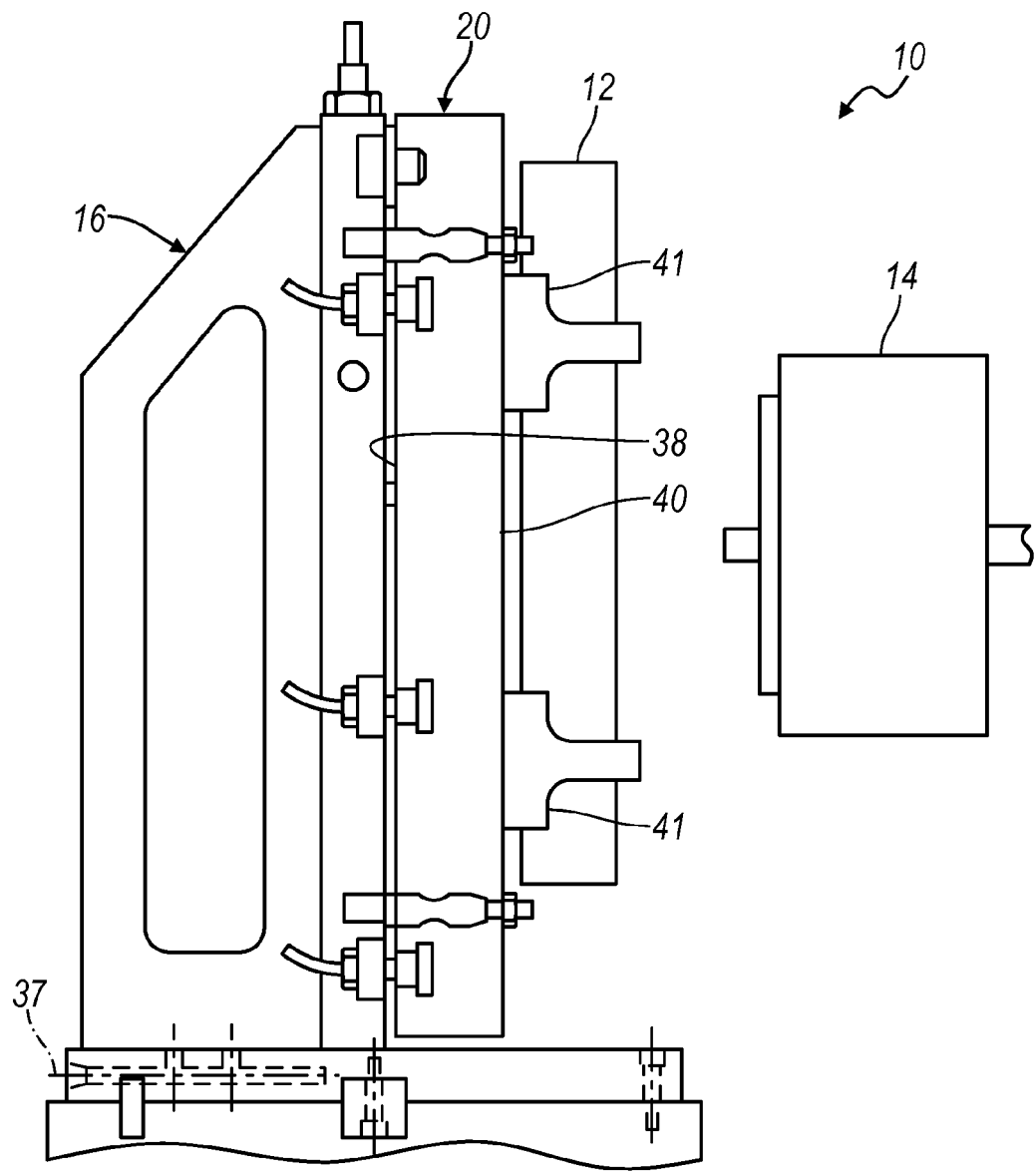
FIG. 1 is a side view of an exemplary CNC machine according to the principles of the present invention.

With combined reference to FIG. 1, an exemplary CNC machine is illustrated schematically and generally indicated by reference number 10. The CNC machine 10 is used to machine an exemplary workpiece 12. Examples of operations capable of being performed on the workpiece 12 by the CNC machine 10 include, but are not limited to, milling, drilling, tapping, and reaming. In the example provided, the workpiece 12 is illustrated as a transmission case. However, it should be appreciated that the workpiece 12 may take various forms without departing from the scope of the present invention. The CNC machine 10 includes a tool 14 operable to perform an operation on the workpiece 12. The tool 14 may take various forms without departing from the scope of the present invention. Examples of tools 14 include, but are not limited to, spindles, drills, grinders, cutters, etc. The workpiece 12 is held stationary relative to the tool 14 by a base fixture 16 and a flexible fixture 20 according to the principles of the present invention.

Figure 2A:
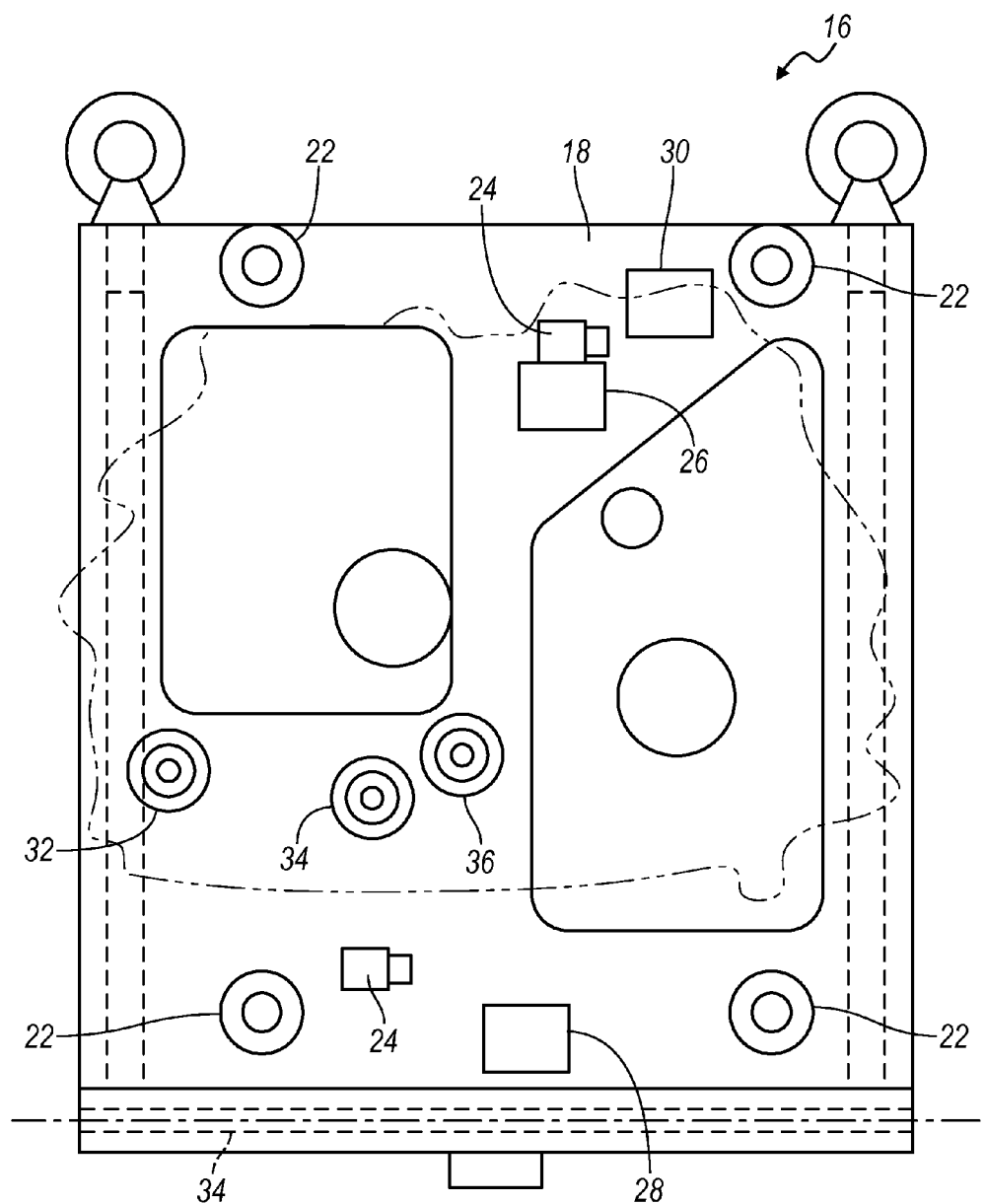
FIG. 2A is a front view of an exemplary base fixture according to the principles of the present invention.
Figure 2B:
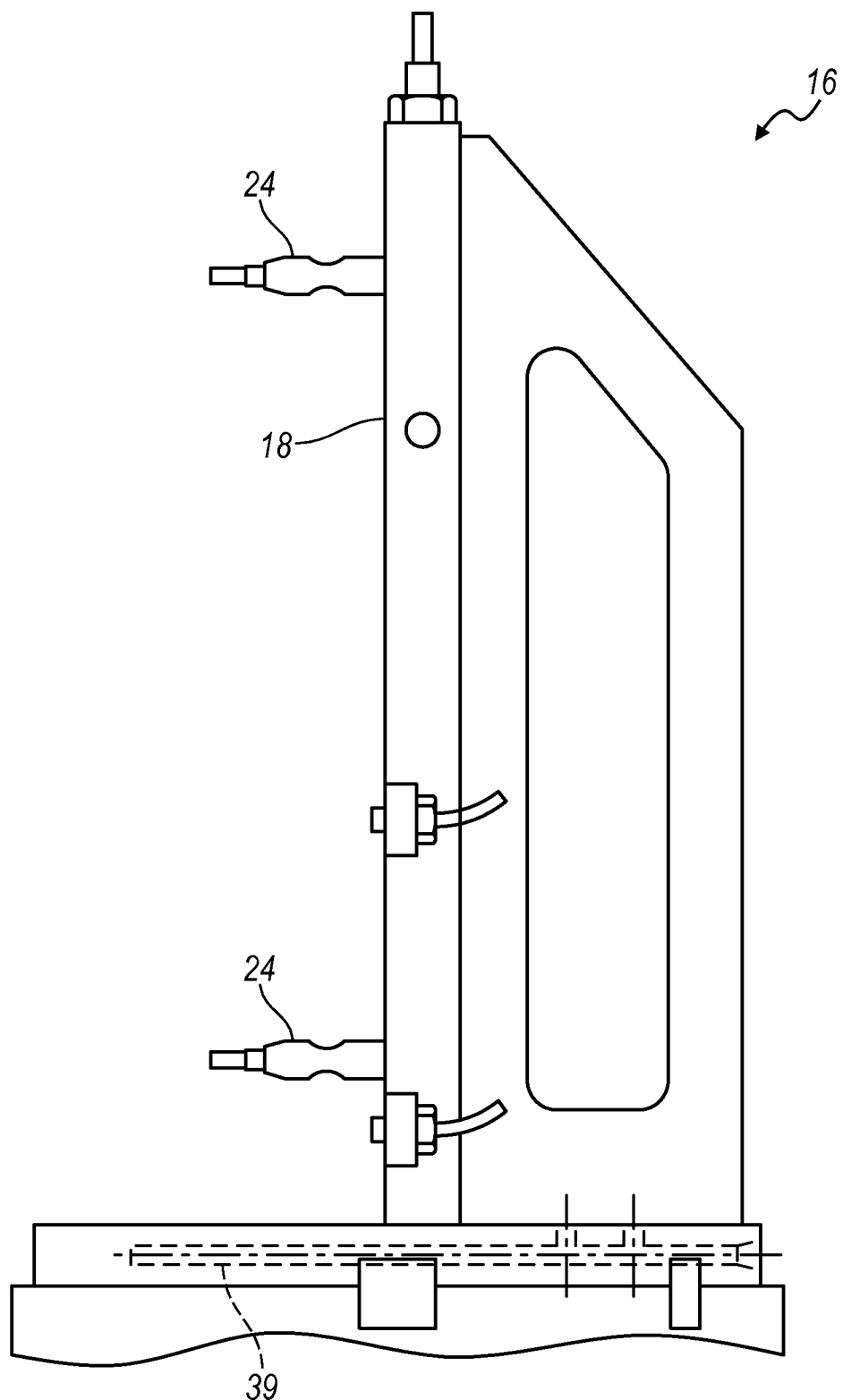
FIG. 2B is a side view of the base fixture according to the principles of the present invention.

Turning to FIGS. 2A and 2B, the base fixture 16 includes a front face 18. Four hydraulically actuated, male clamps 22 are disposed on the front face 18. In the example provided, the four clamps 22 are preferably PAL system clamps available from Pascal Corporation, Japan. However, it should be appreciated that other types of hydraulic clamps may be employed without departing from the scope of the present invention. The clamps 22 are operable to hold and engage the flexible fixture 20, as will be described in greater detail below. Two extending members 24 extend out from the front face 18. The extending members 24 are used to help support the flexible fixture 20.

The base fixture 16 further includes a plurality of quick connects or fixtures disposed in the front face 18 that communicate a hydraulic fluid such as oil, air, and water to the flexible fixture 20. For example, a hydraulic clamp quick connect 26 is disposed near a bottom of the base fixture 16 on the front face 18. The hydraulic clamp quick connect 26 is operable to provide hydraulic fluid to command a clamp operation. A hydraulic unclamp quick connect 28 is operable to provide hydraulic fluid to command an unclamp operation. A hydraulic fixture jack or quick connect 30 is operable to provide hydraulic fluid to actuate a control feature that is employed to support the workpiece 12 to avoid any fluctuation to the workpiece 12 while machining. A pneumatic unclamp verification quick connect 32 is operable to verify that the control features have been unclamped upon receipt of a hydraulic unclamp signal. A pneumatic rest pad control and clamp verification quick connect 34 is operable to control a rest pad (not shown) and to verify that the control features have been clamped upon receipt of the clamp hydraulic signal. Finally, a water quick connect feature 36 is operable to provide water for cooling to the flexible fixture 20. The base fixture further includes a plurality of fluid channels 39 disposed throughout the base fixture that communicate with sources of hydraulic fluid, air, and water 37 and with the hydraulic clamps 22 and the quick connect fixtures 28-36. The fluid channels 39 may have any shape or cross section and have any number of branches without departing from the scope of the present invention. The fluid channels 39 are operable to communicate the hydraulic fluid, air, or water from the sources of hydraulic fluid, air, and water to the hydraulic clamps 22 and the quick connect fixtures 28-36. While the base fixture 16 is, in the example provided, a vertical base fixture, it should be appreciated that the base fixture 16 may be a horizontal base fixture without departing from the scope of the present invention.

Figure 3:
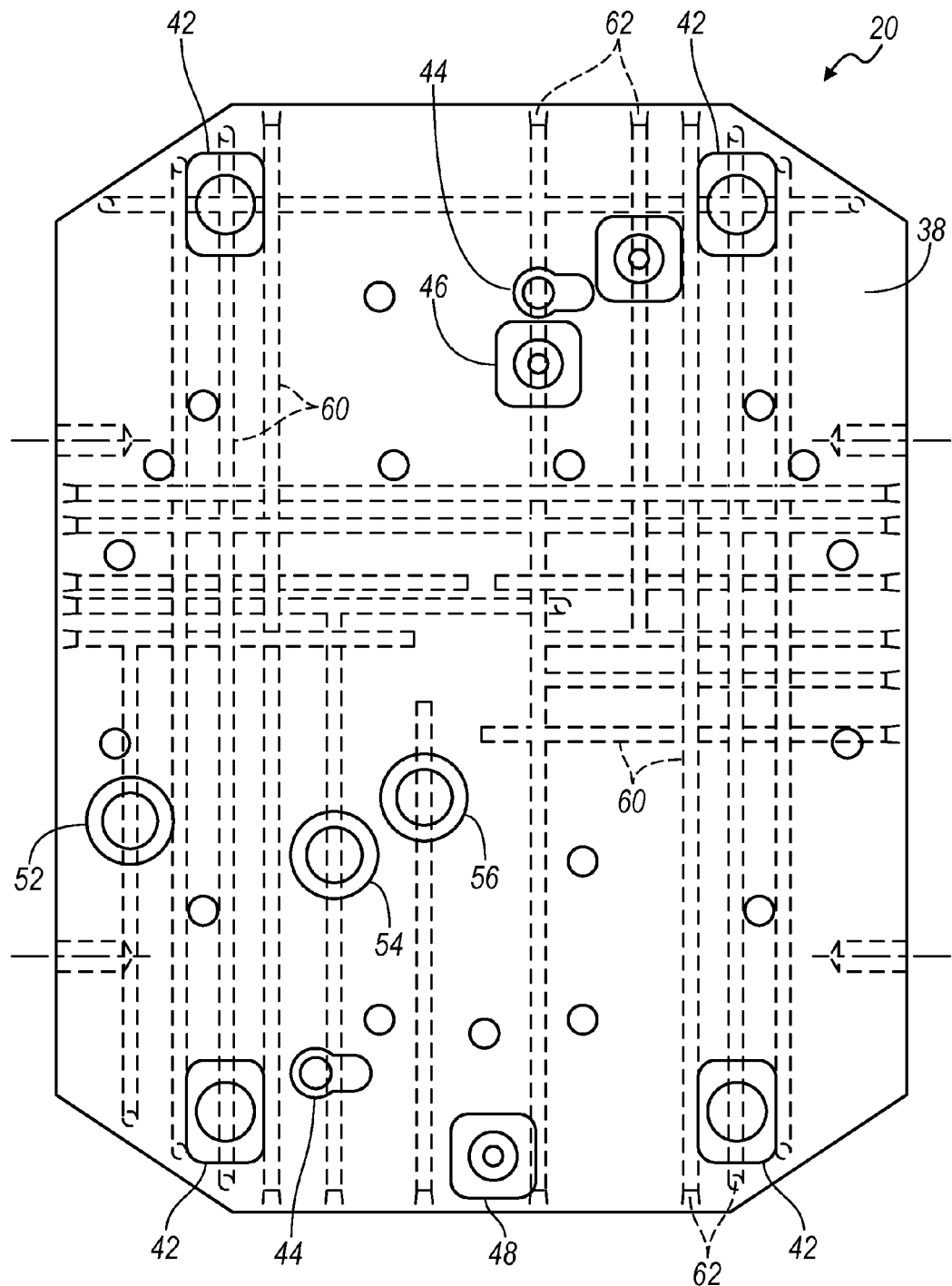
FIG. 3 is a back view of the flexible fixture system illustrating according to the principles of the present invention.

Turning to FIG. 3, and with continued reference to FIGS. 1, 2A, and 2B, the flexible fixture 20 will now be described in greater detail. The flexible fixture 20 is a modular fixture intended to accommodate a specific workpiece 12 such that specific operations may be performed on the workpiece 12 by the CNC machine 10. The flexible fixture 20 is sized to be clamped and supported by the base fixture 16. The flexible fixture 20 is intended to be quickly and easily replaced with other flexible fixtures 20 depending on the type of workpiece 12 to be used and the type of machining operations to be performed. The flexible fixture 20 is shaped as a plate and includes a back surface 38 for engaging the front face 18 of the base fixture 16 and a control surface or front surface 40 having control features 41 for holding and engaging the workpiece 12. It should be appreciated that the control features 41 may vary on the flexible fixture 20 for any given workpiece 12 and machining operation to be performed.

The flexible fixture 20 includes a plurality of clamps and quick connects disposed on the back surface 38 that are operable to engage the clamps and quick connects on the base fixture 16. Accordingly, the flexible fixture 20 includes four hydraulically actuated, female camps 42 operable to engage with the four clamps 22 of the base fixture 16. The four clamps 42 are preferably PAL system clamps available from Pascal Corporation, Japan. However, it should be appreciated that other types of hydraulic clamps may be employed without departing from the scope of the present invention. Two slots 44 extend through the flexible fixture 20 and are sized to receive the two extending members 24 of the base fixture 16. The extending members 24 are used to help support the flexible fixture 20.

A hydraulic clamp quick connect 46 is operable to connect with the hydraulic clamp quick connect 26 of the base fixture 16 to command the control features 41 on the flexible fixture 20 to engage or clamp the workpiece 12. A hydraulic unclamp quick connect 48 is operable to connect with the hydraulic unclamp quick connect 28 of the base fixture 16 to command the control features 41 on the flexible fixture 20 to engage or clamp the workpiece 12. A hydraulic fixture jack or quick connect 50 is operable to connect with the hydraulic fixture jack or quick connect 30 of the base fixture 16 to command the control features 41 to support the workpiece 12 to avoid any fluctuation to the workpiece 12 while machining. In addition, the control features 41 associated with the hydraulic jack quick connect 30 are used to locate the workpiece 12 relative to workpiece datums. A pneumatic unclamp verification quick connect 52 is operable to connect with the pneumatic unclamp verification quick connect 32 to verify whether the control features 41 have unclamped upon receipt of the unclamp command. A pneumatic rest pad control and clamp verification quick connect 54 is operable to connect with the pneumatic rest pad control and clamp verification quick connect 34 of the base fixture 16 to verify whether the control features 41 have clamped upon receipt of the clamp command. These pneumatic verification controls communicate with air sensors in the clamps 42 and clamp features 41 to ensure proper seating of male clamp on female seat. This error proofing feature is used to ensure proper horizontal alignment of the flexible and base fixtures 20 and 16. Finally, a water quick connect feature 56 is operable to connect with the water quick connect feature 36 of the base fixture 16.

The flexible fixture 20 includes a plurality of fluid channels 60 formed within the flexible fixture 20 that communicate between the control features 41 and quick connect features 46-56. The fluid channels 60 may have any shape or cross section and have any number of branches without departing from the scope of the present invention. The fluid channels 60 are operable to communicate the hydraulic fluid, air, or water from the quick connect features 46-56 to the control features 41. A plurality of stops 62 are disposed within the fluid channels 60 along the periphery of the flexible fixture 20 in order to seal the fluid channels 60 and prevent hydraulic fluid, air, and water leakage from the flexible fixture 20.

Figure 4:
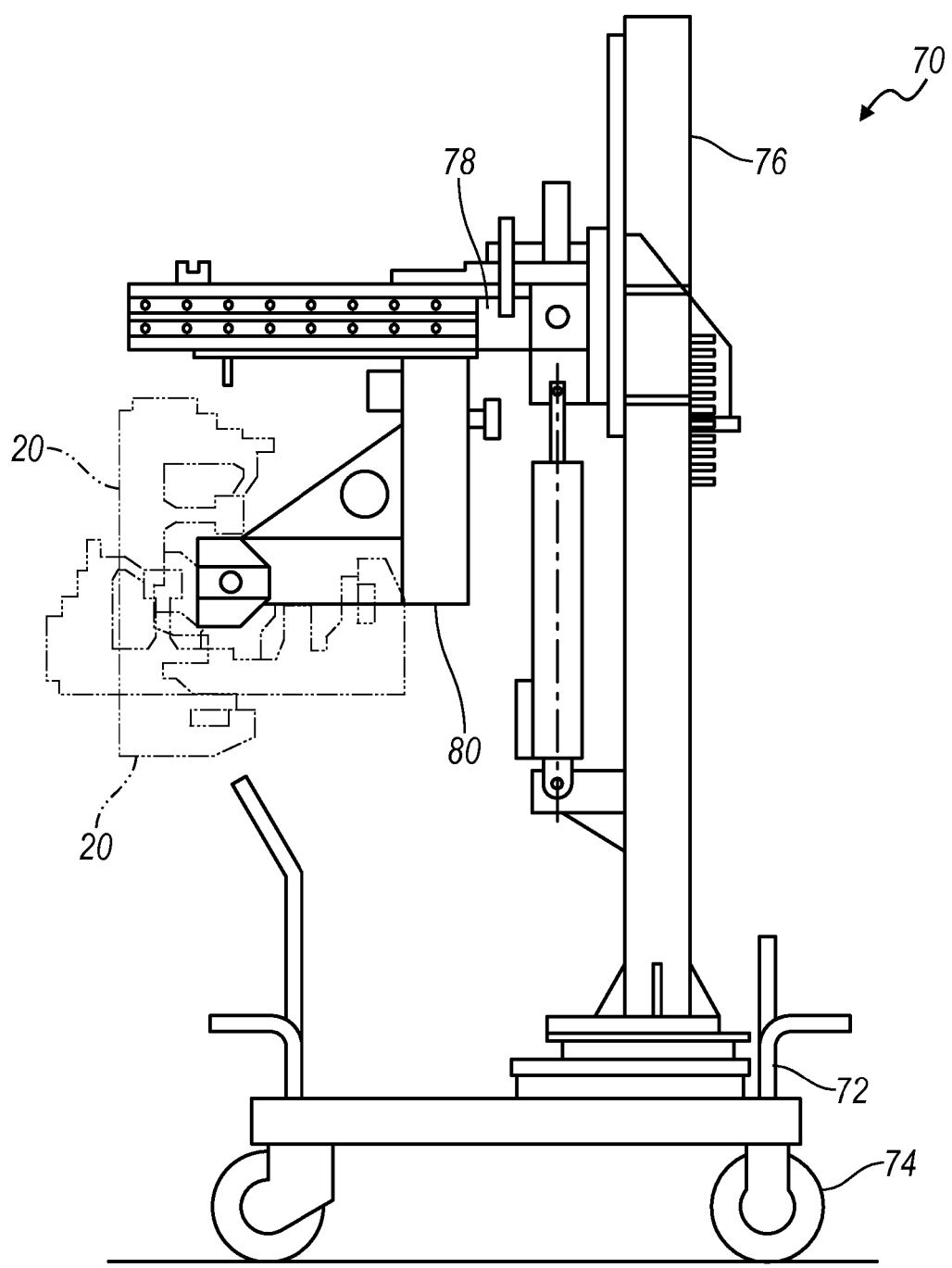
FIG. 4 is a side schematic view of an assembly assist device used with the flexible fixture system of the present invention.

Turning to FIG. 4, an assembly assist device is generally indicated by reference number 70. The assist device 70 is used to quickly and efficiently remove and replace the flexible fixture 20 from the base fixture 16. The assist device 70 includes a base cart 72 having a plurality of lockable wheels 74. A vertical arm 76 extends up from the base cart 72. A horizontal arm 78 is slidably disposed on the vertical arm 76. A piston cylinder 80 is connected to the horizontal arm 78 and the vertical arm 76. The piston cylinder 80 is used to raise and lower the horizontal arm 78 relative to the vertical arm 76.

A bracket 80 is slidably disposed on the horizontal arm 78. The bracket 80 is disposed underneath the horizontal arm 78. The bracket 80 is configured to engage the flexible fixture 20, either in a vertical position or a horizontal position. Preferably, bolts are employed to connect the flexible fixture 20 to the bracket 80, however, other means of connecting the flexible fixture 20 to the bracket 80 may be employed without departing from the scope of the present invention. The assembly assist device 70 is operable to swap flexible fixtures up to and exceeding 450 pounds. While the assembly assist device 70 is a manually operated device in the example provided, it should be appreciated that the assist device 70 may be an automated assist device without departing from the scope of the present invention.

The description of the invention is merely exemplary in nature and variations that do not depart from the gist of the invention are intended to be within the scope of the invention. Such variations are not to be regarded as a departure from the spirit and scope of the invention.

The invention claimed is:

1. A fixture system for engaging a workpiece in a machining operation, the fixture system comprising:
   a source of at least one of a fluid or gas;
   a base fixture having a front face, at least one attachment device disposed on the front face, and a plurality of quick connects disposed on the front face, wherein the plurality of quick connects are configured to communicate with the source of at least one of fluid or gas; and
   a modular fixture selectively attachable to the base fixture, the modular fixture having a back face, a control face for receiving the workpiece, at least one attachment device disposed on the back face, and a plurality of quick connects disposed on the back face, and a plurality of control features disposed on the control face, the plurality of control features in communication with the plurality of quick connects and configured to support the workpiece and perform an operation on the workpiece,
   wherein the attachment device of the base fixture is connected with the attachment device of the modular fixture to secure the modular fixture to the base fixture and at least one or more of the plurality of quick connects of the base fixture are connected with at least one of the plurality of quick connects of the modular fixture to provide communication from the source of at least one of fluid or gas to the plurality of control features of the modular fixture when the modular fixture is attached to the base fixture, and
   wherein the plurality of quick connects of the base fixture includes a water quick connect and the plurality of quick connects of the modular fixture includes a water quick connect, and wherein the water quick connects provide water from the source of at least one of a fluid or gas to the modular fixture to cool the modular fixture during machining.

2. The fixture system of claim 1 wherein the attachment device of the base fixture is a hydraulically actuated male clamp and the attachment device of the modular fixture is a female clamp configured to be clamped by the male clamp when the modular fixture is secured to the base fixture.

3. The fixture system of claim 1 wherein the plurality of quick connects of the base fixture include a hydraulic clamp quick connect and the plurality of quick connects of the modular fixture include a hydraulic clamp quick connect in communication with one of the plurality of control features configured to clamp the workpiece upon receipt of a clamp hydraulic fluid signal from the source of at least one of a fluid or gas.

4. The fixture system of claim 3 wherein the plurality of quick connects of the base fixture include a hydraulic unclamp quick connect and the plurality of quick connects of the modular fixture include a hydraulic unclamp quick connect in communication with one of the plurality of control features configured to unclamp the workpiece upon receipt of a unclamp hydraulic fluid signal from the source of at least one of a fluid or gas.

5. The fixture system of claim 4 wherein the plurality of quick connects of the base fixture include a pneumatic clamp verification quick connect and the plurality of quick connects of the modular fixture include a pneumatic clamp verification quick connect in communication with one of the plurality of control features configured to clamp the workpiece upon receipt of the clamp hydraulic fluid signal, and wherein a pneumatic signal is sent via the pneumatic clamp verification quick connects to verify that the control feature has been clamped upon receipt of the clamp hydraulic signal.

6. The fixture system of claim 5 wherein the plurality of quick connects of the base fixture include a pneumatic unclamp verification quick connect and the plurality of quick connects of the modular fixture include a pneumatic unclamp verification quick connect in communication with one of the plurality of control features configured to unclamp the workpiece upon receipt of the unclamp hydraulic fluid signal, and wherein a pneumatic signal is sent via the pneumatic unclamp verification quick connects to verify that the control feature has been unclamped upon receipt of the clamp hydraulic signal.

7. The fixture system of claim 1 wherein the plurality of quick connects of the base fixture include hydraulic jack quick connect and the plurality of quick connects of the modular fixture include a hydraulic fixture jack quick connect, and wherein the hydraulic jack quick connects provide hydraulic fluid from the source of at least one of a fluid or gas to actuate a control feature that is employed to support the workpiece to avoid any fluctuation to the workpiece while machining.

8. The fixture system of claim 1 wherein the base fixture further includes a plurality of fluid channels disposed throughout the base fixture that communicate with the source of hydraulic at least one of fluid or gas and with the attachment device of the base fixture and the plurality of quick connects of the base fixture in order to communicate a fluid signal or gas signal from the source of at least one of fluid or gas to the attachment device and plurality of quick connects of the base fixture.

9. The fixture system of claim 1 wherein the modular fixture further includes a plurality of fluid channels disposed throughout the base fixture that communicate with the attachment device of the base fixture and the plurality of quick connects of the base fixture and the plurality of control features in order to communicate a fluid signal or gas signal from the source of at least one of fluid or gas to the control features.

10. The fixture system of claim 1 wherein the base fixture includes at least one extending member on the front face that interfaces with at least one slot on the back face of the modular fixture to support the modular fixture when the modular fixture is attached to the base fixture.

11. The fixture system of claim 1 wherein the base fixture is a vertical base fixture.

12. The fixture system of claim 1 wherein the base fixture is a horizontal base fixture.

13. A fixture system for engaging a workpiece in a CNC machining operation, the fixture system comprising:
   a source of at least one of a fluid or gas;
   a base fixture having a front face, at least one attachment device disposed on the front face in communication with the source of at least one of fluid or gas, and a first plurality of quick connects disposed on the front face, wherein the plurality of quick connects are configured to communicate with the source of fluid or gas; and
   a modular fixture selectively attachable to the base fixture, the modular fixture having a back face, a control face for receiving the workpiece, at least one attachment device disposed on the back face, a second plurality of quick connects disposed on the back face, and a plurality of control features disposed on the control face, the plurality of control features in communication with at least one of the second plurality of quick connects and configured to support the workpiece and perform an operation on the workpiece, wherein the attachment device of the base fixture is connected with the attachment device of the modular fixture to secure the modular fixture to the base fixture and at least one or more of the first plurality of quick connects are connected with at least one of the second plurality of quick connects to provide communication from the source of fluid or gas to the plurality of control features of the modular fixture when the modular fixture is attached to the base fixture.

14. The fixture system of claim 13 wherein the attachment device of the base fixture is a hydraulically actuated male clamp and the attachment device of the modular fixture is a female clamp configured to be clamped by the male clamp when the modular fixture is secured to the base fixture.

15. The fixture system of claim 13 wherein the first plurality of quick connects are aligned and connected with the second plurality of quick connects when the modular fixture is attached to the base fixture.

16. The fixture system of claim 13 wherein the first and second plurality of quick connects are selected from male and female quick connects.

17. The fixture system of claim 13 wherein the base fixture includes at least one extending member on the front face that interfaces with at least one slot on the back face of the modular fixture to support the modular fixture when the modular fixture is attached to the base fixture.

* * * * *